July 23, 1940.                R. M. ROWELL                 2,209,236
                DAMPING SYSTEM FOR MEASURING DEVICES
                        Filed May 5, 1939
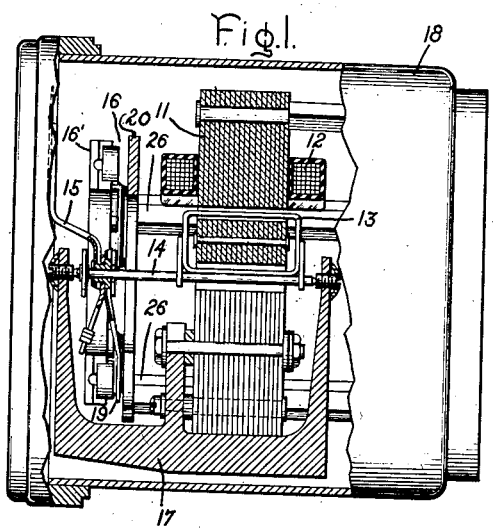
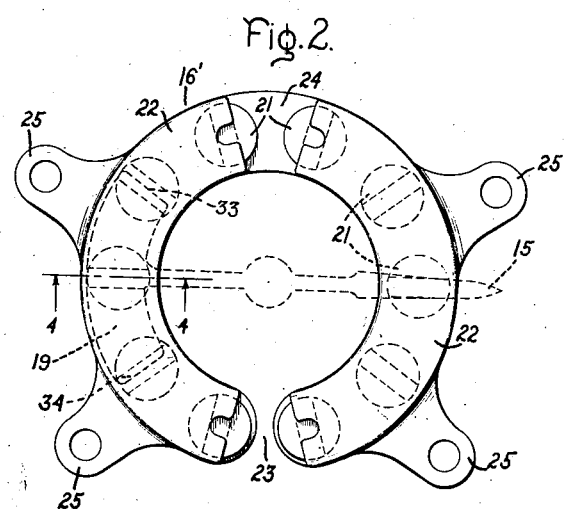
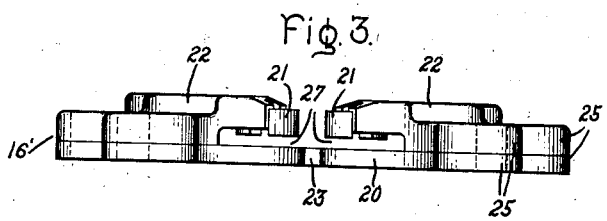
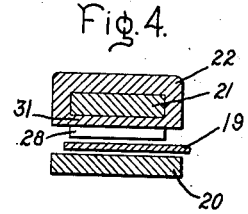
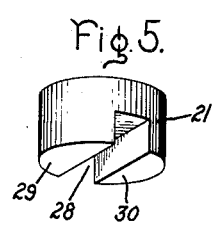
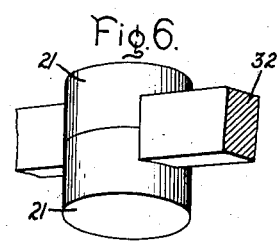
Inventor:
Ralph M. Rowell,
by Harry E. Dunham
   His Attorney.

Patented July 23, 1940

2,209,236

UNITED STATES PATENT OFFICE 2,209,236

DAMPING SYSTEM FOR MEASURING DEVICES

Ralph M. Rowell, Lynn, Mass., assignor to General Electric Company, a corporation of New York Application May 5, 1939, Serial No. 271,949

4 Claims. (Cl. 188—104)

My invention relates to indicating instruments and concerns particularly damping arrangements for deflecting measuring instruments of the long range type.

It is an object of my invention to provide an improved, efficient, light, and compact damping arrangement for instruments which have relatively rotatable parts designed for rotation through a large fraction of a complete revolution or for rotation through a plurality of revolutions.

Other and further objects and advantages will become apparent as the description proceeds.

In carrying out my invention in its preferred form in connection with a 250 degree deflecting pointer type measuring instrument, for example, I provide a light damping vane of current-conducting material, which is arcuate in shape and concentric with the axis of revolution of the movable element of the instrument, and a damping field-producing member including a soft iron ring-shaped keeper member and a plurality of button type permanent magnets composed of high-coercive-force permanent-magnet material spaced from the keeper member to form air gaps through which the vane travels as the moving element of the instrument deflects.

The invention may be understood more readily from the following detailed description when considered in connection with the accompanying drawing and those features of the invention which are believed to be novel and patentable will be pointed out in the claims appended hereto. In the drawing Figure 1 is a side elevation of an electrical instrument embodying my invention having a portion thereof cut away to expose a vertical section through the instrument. Figure 2 is a front elevation of the damping system shown in the instrument of Figure 1. Figure 3 is a bottom plan view of the apparatus of Figure 2. Figure 4 is a cross section through the apparatus of Figure 2 cut by the plane 4—4. Figure 5 is a perspective view of one of the button magnets utilized in the apparatus of the preceding figures and Figure 6 is a diagrammatic perspective view of an arrangement for magnetizing the button magnets. Like reference characters are utilized throughout the drawing to designate like parts.

In Figure 1 a damping arrangement constructed in accordance with my invention is illustrated in connection with a long scale wattmeter designed for an angular length of scale of 250 degrees or more. The wattmeter comprises a magnetic field system 11 composed of laminated magnetizable material, a stationary field coil 12, a rotatable eccentrically mounted coil 13 carried by a rotatable shaft 14, a pointer 15 also carried by the shaft 14 cooperating with a scale, not shown, a damping system 16, and a frame 17 for supporting the parts of the instrument, all mounted within a suitable casing 18.

The damping system 16 includes a damping field-producing member 16' shown more clearly in Figures 2 and 3 and a damping vane 19. The damping field-producing member 16' comprises a substantially ring-shaped keeper member 20 composed of a relatively permeable magnetic material, such as soft iron or punched steel, for example, a plurality of button type permanent magnets 21 and a substantially ring-shaped magnet holding member 22. The keeper member 20 and the holding member 22 need not be complete rings. For example, there may be a break 23 in the keeper member 20 and the magnet holding member 22 may, if desired, be in two parts having breaks at 23 and 24. For the purpose of securing the magnet holding member 22 to the keeper member 20 and supporting them, they may be provided with radially projecting ears 25 having openings therein for bolting the damping field-producing member 16 to a suitable stationary part of the apparatus, such as the posts 26 shown in Figure 1. The button type magnets 21 are so mounted in the magnet holding member 22 as to be radially spaced from the magnet keeper member 20 to leave air gaps 27 through which the damping vane 19 may travel as the movable coil 13 of the instrument deflects. The damping vane 19 is secured to the shaft 14 and is preferably composed of some relatively light, but high-conductivity current-conducting material, such as aluminum, for example.

The damping field-producing member 16' and the damping vane 19 are concentric with the instrument shaft 14. The button magnets 21 are mounted around the periphery of a circle having a radius the same as the mean radius of the arcuate damping vane 19 so that the damping vane is under the influence of the magnetic field of some of the button magnets regardless of its angular position. Preferably the button magnets are spaced at substantially equal intervals around the periphery of the circle and the angular length of the damping vane 19 is made not less than substantially twice the angular spacing interval of the button magnets in order that the damping vane will always be in the field of at least two button magnets and the damping effect will be substantially uniform.

The magnet holding member 22 is composed of any suitable nonmagnetic material, for example, a die casting alloy. Accordingly when forming the magnet holding member 22 the button magnets 21 may be mounted in the mold as inserts so that they will be held in position by the die casting operation.

The button magnets 21 are preferably composed of a high-coercive-force permanent-magnet material such as the material described, for example, in United States Patent 1,968,569 Ruder and I have obtained satisfactory results with alloys composed of from 17 to 20% nickel, 55 to 63% iron, 10 to 12% aluminum and up to 12% cobalt. The button type magnets 21 consist of small flat cylinders or buttons with a diametrical notch 28 cut in one face thereof (Figure 5). The buttons are so magnetized that the portions of the slotted base of the cylinder on either side of slot 28 form pole faces 29 and 30 of opposite polarity. It will be observed from Figure 4 that, in die casting the button 21 into the magnet holding member 22, a portion of the die cast material 31 is caused to flow around the base of the slot 28 in order to form a secure and rigid holding structure for the button magnet 21. It will be understood that the distance across the notch 28 from pole to pole is to be no less than twice the length of the air gap 27 in order to avoid excessive leakage flux. I have obtained satisfactory results by making the air gap $\frac{1}{16}$ inch and the distance between pole faces across the notch $\frac{1}{8}$ inch. The button magnets may be regarded as U-type magnets as distinguished from bar magnets for the reason that they have their pole faces in relatively close proximity and in the same plane.

The button magnets 21 may be magnetized in any desired manner, but it will be understood that owing to their high-coercive-force a high magnetizing force will be required. For example, if desired, two buttons to be magnetized may be placed on either side of a current conducting bar 32 of such size as to fit into the magnet slots 28 and to allow the pole faces of the two button magnets to abut. A very heavy direct current is then passed through the bar 32 by means of any suitable high-current low-voltage source, such as a welding generator, for example.

In order that the damping vane 19 may be caused to have its leading end 33 pass under the influence of one of the poles of one of the button magnets simultaneously with the trailing end 34 of the vane passing away from one of the poles of another of the button type magnets, the arcuate length of the vane 19 may be made an even multiple of the arcuate spacing between the centers of the button magnets, and the button magnets may be mounted with their slots 28 radial so that the centers of the pole faces all lie in the same circle and have the same radius as the average radius of the vane 19. Preferably the angular length of the damping vane 19 is not less than substantially twice the angular spacing between the button magnets 21.

It will be understood by those skilled in the art that damping of the motion of the movable element of the instrument takes place in a manner common to electromagnetically damped instruments. The flux from each button magnet reaches across the air gap to the soft iron keeper 20. Since each of the individual button magnets has two pole faces the flux from the north pole will bridge the gap to the keeper member and thence return across the second gap from the keeper member to the south pole. The flux is intercepted by the motion of the vane 19 which is attached to the movable element and eddy currents are set up in the vane in such a direction as to oppose the motion of the movable element.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A damping system for long range deflecting instruments having relatively rotatable elements, comprising in combination an arc-shaped damping vane concentric with the axis of relative rotation of the instrument elements composed of relatively light current-conducting material secured to one of said elements, and a magnetic field-producing member secured to the other of said elements, said latter member comprising a substantially ring-shaped keeper member composed of magnetizable material, a magnet holding member composed of nonmagnetic material and a plurality of button type permanent magnets composed of high-coercive-force material mounted in said magnet holding member around the periphery of a circle with their pole faces axially spaced from said keeper member to form air gaps including the path of said vane and with their pole centers at substantially equal radial distances from the axis of relative rotation, the angular length of said damping vane being not less than substantially twice the angular spacing between said button magnets.

2. A damping system for long range deflecting instruments having relaitvely rotatable elements, comprising in combination a damping vane composed of current-conducting material secured to one of said elements and a magnetic field-producing member secured to the other of said elements, said latter member comprising a substantially ring-shaped keeper member composed of magnetizable material, and a plurality of button type permanent magnets composed of high-coercive-force permanent-magnet material mounted around the periphery of a circle, each such magnet having a plurality of pole faces axially spaced from said keeper member to form air gaps including the path of said vane.

3. A damping system for an instrument having relatively rotatable elements comprising a damping vane composed of current-conducting material secured to one of said elements and a magnetic field-producing member secured to the other of said elements, said latter member comprising a substantially ring-shaped keeper member composed of magnetizable material, and a plurality of closely spaced U-type permanent magnets each having a pair of pole faces spaced from said keeper member to form air gaps, each including the path of said vane.

4. A damping system for a current responsive device having relatively rotatable elements comprising a damping member composed of current-conducting material secured to one of said elements and a magnetic field-producing member secured to the other of said elements, said latter member comprising a plurality of permanent magnets each with a pair of pole faces, all of said pole faces being closely spaced around the periphery of a circle, and means composed of magnetizable material with the surface portion spaced from said pole faces to form air gaps adapted to receive said damping member.

RALPH M. ROWELL.